US011204296B2

(12) United States Patent
Wang et al.

(10) Patent No.: US 11,204,296 B2
(45) Date of Patent: Dec. 21, 2021

(54) HORIZONTAL INSTRUMENT, A SUPPORTING DEVICE AND A METHOD FOR ADJUSTING THE BEARING SURFACE OF THE SUPPORTING DEVICE TO BE HORIZONTAL

(71) Applicants: Chuhan Wang, Ningbo (CN); Yinghao Wang, Ningbo (CN)

(72) Inventors: Chuhan Wang, Ningbo (CN); Yinghao Wang, Ningbo (CN)

( * ) Notice: Subject to any disclaimer, the term of this patent is extended or adjusted under 35 U.S.C. 154(b) by 0 days.

(21) Appl. No.: 16/550,862

(22) Filed: Aug. 26, 2019

(65) Prior Publication Data
US 2021/0063266 A1   Mar. 4, 2021

(30) Foreign Application Priority Data

Jul. 26, 2019 (CN) .......................... 201910682148.0

(51) Int. Cl.
*G01M 1/14*   (2006.01)
*B60N 2/39*   (2006.01)
(Continued)

(52) U.S. Cl.
CPC ................ *G01M 1/14* (2013.01); *A47B 91/16* (2013.01); *B60N 2/39* (2013.01); *B60N 2/501* (2013.01);
(Continued)

(58) Field of Classification Search
CPC ........ F16M 11/18; A47C 3/025; A47C 3/0251; A47C 3/0255; A47C 21/006; B60N 2/39; B60N 2/0232; B60N 2/0244; B60N 2/04; B60N 2/501; B60N 2/502; B60N 2/4273; B60N 2/42736; A63B 22/16; A63B 22/18; A63B 22/14; A63G 31/16; A63G 31/02;
(Continued)

(56) References Cited

U.S. PATENT DOCUMENTS

| 1,599,941 | A | * | 9/1926 | Ammon | .................... | B60N 2/39 248/242 |
| 1,640,812 | A | * | 8/1927 | Ammon | .................... | B60N 2/39 248/596 |

(Continued)

FOREIGN PATENT DOCUMENTS

| JP | 07149171 A | * | 6/1995 | ............... B60N 2/39 |
| JP | 2004114757 A | * | 4/2004 | ............... B60N 2/39 |

*Primary Examiner* — Jonathan Liu
*Assistant Examiner* — Taylor L Morris
(74) *Attorney, Agent, or Firm* — Getech Law LLC; Jun Ye

(57) ABSTRACT

The present invention provides a horizontal instrument, a supporting device and a method for adjusting the bearing surface of the supporting device to be horizontal. The horizontal instrument in the present invention is used for maintaining a bearing surface parallel to a horizontal plane, wherein the horizontal instrument comprises a slide-swing assembly, and a monitoring assembly, when the monitoring assembly detects that the bearing surface is not parallel to the horizontal plane, the controller instructs the driving unit to drive the slider to slide, which leads the lower end of the swinging rod to slide, and then drives the swinging rod to swing, thereby, the upper end of the swinging rod drives the bearing surface to rotate for an angle so that the bearing surface is maintained parallel to the horizontal plane.

5 Claims, 11 Drawing Sheets

(51) Int. Cl.
  *B60N 2/50* (2006.01)
  *A47B 91/16* (2006.01)
  *G09B 9/12* (2006.01)
  *B60N 2/02* (2006.01)
  *B60R 21/015* (2006.01)

(52) U.S. Cl.
  CPC ....... *B60N 2/0244* (2013.01); *B60R 21/01516* (2014.10); *G09B 9/12* (2013.01)

(58) Field of Classification Search
  CPC ... G09B 9/12; G09B 9/02; G09B 9/04; G09B 9/14; G09B 9/05; G06T 19/006; G06F 3/011
  USPC .................................. 108/144.11, 145, 147
  See application file for complete search history.

(56) References Cited

U.S. PATENT DOCUMENTS

| | | | | |
|---|---|---|---|---|
| 2,689,599 A * | 9/1954 | Mauser | A47C 7/441 | 248/578 |
| 3,403,905 A * | 10/1968 | Hamilton | A61H 1/02 | 601/23 |
| 3,405,900 A * | 10/1968 | Robinson | B60N 2/181 | 248/396 |
| 4,022,411 A * | 5/1977 | Rumsey | B60N 2/501 | 248/580 |
| 4,273,461 A * | 6/1981 | Kjellstrand | B60N 2/39 | 403/123 |
| 4,360,182 A * | 11/1982 | Titus | G01D 11/30 | 248/371 |
| 4,584,896 A * | 4/1986 | Letovsky | A63G 31/16 | 434/55 |
| 4,806,068 A * | 2/1989 | Kohli | B25J 9/04 | 414/735 |
| 4,887,967 A * | 12/1989 | Letovsky | G09B 9/058 | 434/61 |
| 4,974,904 A * | 12/1990 | Phillips | A47C 9/002 | 297/258.1 |
| 5,022,708 A * | 6/1991 | Nordella | A47C 7/72 | 248/182.1 |
| 5,169,112 A * | 12/1992 | Boyles | B60N 2/501 | 248/550 |
| 5,346,170 A * | 9/1994 | Schmidt | B60N 2/501 | 248/421 |
| 5,358,305 A * | 10/1994 | Kaneko | B60N 2/0224 | 180/89.14 |
| 5,374,022 A * | 12/1994 | Gilmer, Jr. | B63B 29/04 | 248/396 |
| 5,551,920 A * | 9/1996 | Ogden | A63G 31/16 | 434/55 |
| 5,605,462 A * | 2/1997 | Denne | F15B 15/00 | 434/372 |
| 5,685,718 A * | 11/1997 | McClintic | G09B 9/12 | 434/38 |
| 5,752,834 A * | 5/1998 | Ling | G09B 9/12 | 434/55 |
| 5,795,022 A * | 8/1998 | Brown | A47C 9/002 | 297/217.7 |
| 5,812,399 A * | 9/1998 | Judic | B60N 2/0224 | 296/65.01 |
| 5,839,782 A * | 11/1998 | Kashiwamura | B60N 2/502 | 297/337 |
| 5,901,612 A * | 5/1999 | Letovsky | A47C 1/12 | 248/661 |
| 5,954,508 A * | 9/1999 | Lo | G09B 9/02 | 297/257 |
| 6,027,342 A * | 2/2000 | Brown | G09B 9/14 | 434/55 |
| 6,035,715 A * | 3/2000 | Porter | G01M 7/02 | 73/432.1 |
| 6,038,940 A * | 3/2000 | Rosheim | G09B 9/12 | 434/55 |
| 6,042,382 A * | 3/2000 | Halfhill | A63G 1/26 | 434/55 |
| 6,059,253 A * | 5/2000 | Koutsky | B60N 2/501 | 248/550 |
| 6,077,078 A * | 6/2000 | Alet | F16M 11/046 | 434/29 |
| 6,120,082 A * | 9/2000 | Vandermolen | B60N 2/02 | 248/550 |
| 6,152,828 A * | 11/2000 | Tomita | A63G 31/16 | 434/55 |
| 6,162,058 A * | 12/2000 | Yang | G09B 9/14 | 434/55 |
| 6,210,164 B1 * | 4/2001 | Otto | G09B 9/02 | 434/29 |
| 6,247,366 B1 * | 6/2001 | Porter | G01M 7/02 | 73/432.1 |
| 6,257,663 B1 * | 7/2001 | Swierczewski | B60N 2/4214 | 297/216.16 |
| 6,273,389 B1 * | 8/2001 | Carlgren | B60N 2/39 | 180/41 |
| 6,325,167 B1 * | 12/2001 | Jiang | A61G 5/04 | 180/9.32 |
| 6,445,960 B1 * | 9/2002 | Borta | G09B 9/02 | 434/30 |
| 6,624,802 B1 * | 9/2003 | Klein | A63F 13/06 | 345/156 |
| 6,857,674 B2 * | 2/2005 | Chareyre | B64D 11/0696 | 248/421 |
| 7,100,983 B1 * | 9/2006 | Gant | A47C 3/025 | 108/2 |
| 7,124,660 B2 * | 10/2006 | Chiang | A47B 91/16 | 74/490.05 |
| 7,506,910 B2 * | 3/2009 | Leitner | B60N 2/0232 | 296/65.01 |
| 8,061,755 B2 * | 11/2011 | Brendel | A61G 5/045 | 296/65.15 |
| 8,182,036 B2 * | 5/2012 | Nishino | A47C 3/027 | 297/258.1 |
| 8,298,845 B2 * | 10/2012 | Childress | A63F 13/08 | 438/47 |
| 8,384,530 B2 * | 2/2013 | Inayoshi | B60N 2/002 | 180/273 |
| 8,403,673 B2 * | 3/2013 | Atluri | G09B 9/14 | 434/55 |
| 8,448,529 B2 * | 5/2013 | Aoyama | B60N 2/002 | 73/862.381 |
| 8,548,678 B2 * | 10/2013 | Ummethala | B60N 2/501 | 267/140.15 |
| 8,565,982 B2 * | 10/2013 | Lofstrand | A61G 5/04 | 280/35 |
| 8,568,343 B2 * | 10/2013 | Fuster | A63B 21/0058 | 601/84 |
| 8,662,585 B2 * | 3/2014 | Garvis | G09B 9/12 | 297/314 |
| 8,678,508 B2 * | 3/2014 | Kolb | B60N 2/501 | 297/463.2 |
| 9,377,074 B2 * | 6/2016 | Lorey | F16F 9/0281 | |
| 9,545,581 B2 * | 1/2017 | Douglas | A63G 31/16 | |
| 9,694,294 B1 * | 7/2017 | Petrov | A63F 13/24 | |
| 9,802,513 B2 * | 10/2017 | Katoh | A47C 1/024 | |
| 9,852,650 B2 * | 12/2017 | Mar | G09B 9/04 | |
| 10,245,987 B2 * | 4/2019 | Castillo | B60N 2/502 | |
| 10,342,356 B1 * | 7/2019 | Roberts | G09B 9/12 | |
| 10,373,513 B2 * | 8/2019 | Atluri | G09B 9/12 | |
| 2002/0135214 A1 * | 9/2002 | Ursel | B60N 2/1885 | 297/330 |
| 2004/0092308 A1 * | 5/2004 | Lim | A47C 3/02 | 463/30 |
| 2004/0108146 A1 * | 6/2004 | Rundell | B60R 21/01516 | 177/144 |
| 2004/0168842 A1 * | 9/2004 | Chuan | B60N 2/0232 | 180/41 |
| 2005/0277092 A1 * | 12/2005 | Hwang | G09B 19/16 | 434/55 |
| 2006/0144630 A1 * | 7/2006 | Breed | B60N 2/002 | 180/273 |

(56) References Cited

U.S. PATENT DOCUMENTS

| | | | | |
|---|---|---|---|---|
| 2006/0261647 A1* | 11/2006 | Maas | B60N 2/522 | 297/216.1 |
| 2008/0097256 A1* | 4/2008 | Torres | A61G 5/1043 | 601/24 |
| 2008/0284362 A1* | 11/2008 | Buhlheller | B60N 2/0244 | 318/434 |
| 2009/0198419 A1* | 8/2009 | Clark | B60N 2/501 | 701/49 |
| 2009/0230743 A1* | 9/2009 | Derakhshan | A47C 9/002 | 297/329 |
| 2010/0066137 A1* | 3/2010 | Sakai | B60N 2/002 | 297/217.3 |
| 2012/0025577 A1* | 2/2012 | Kolb | B60N 2/38 | 297/344.13 |
| 2012/0264579 A1* | 10/2012 | Klein | G09B 9/04 | 482/146 |
| 2012/0267503 A1* | 10/2012 | Gribble | B60N 2/39 | 248/393 |
| 2012/0298796 A1* | 11/2012 | Carreker | B64G 1/22 | 244/100 R |
| 2013/0131923 A1* | 5/2013 | Tzipman | B62D 24/04 | 701/38 |
| 2014/0302462 A1* | 10/2014 | Vatcher | A63G 31/16 | 434/55 |
| 2015/0323415 A1* | 11/2015 | In | G09B 9/06 | 73/11.04 |
| 2016/0081483 A1* | 3/2016 | Harrison | A47C 31/126 | 297/217.2 |
| 2016/0082870 A1* | 3/2016 | Fujita | B60N 2/522 | 248/561 |
| 2016/0167224 A1* | 6/2016 | Foster | G05B 11/011 | 318/601 |
| 2016/0280098 A1* | 9/2016 | Frye | B60N 2/0228 | |
| 2016/0320862 A1* | 11/2016 | Schradin | A63F 13/00 | |
| 2016/0355238 A1* | 12/2016 | Charleston | B63B 29/04 | |
| 2017/0148338 A1* | 5/2017 | So | G09B 9/00 | |
| 2017/0166098 A1* | 6/2017 | Haller | B60N 2/525 | |
| 2017/0217514 A1* | 8/2017 | Chan | B60N 2/0244 | |
| 2018/0104578 A1* | 4/2018 | Travis | A47C 7/004 | |
| 2019/0023161 A1* | 1/2019 | Sullivan | B60N 2/06 | |
| 2019/0047448 A1* | 2/2019 | Ausenda | A63G 31/02 | |
| 2019/0381914 A1* | 12/2019 | Kaneko | B60W 10/04 | |

\* cited by examiner

HORIZONTAL INSTRUMENT, A SUPPORTING DEVICE AND A METHOD FOR ADJUSTING THE BEARING SURFACE OF THE SUPPORTING DEVICE TO BE HORIZONTAL

TECHNICAL FIELD

The present invention relates to the field of supporting devices, and more particularly to a horizontal instrument, a supporting device and a method for maintaining a spatial position of a supporting device.

BACKGROUND ARTS

Supporting devices, such as a stool or a table or the like, can provide a bearing surface at a predetermined distance from the floor/ground, so that the supporting device can be used to support a to-be-supported body at a predetermined height from the floor/ground.

The to-be-supported body may be an article or a person. When the supporting device is implemented as a stool, the bearing surface formed by the supporting device can be used to carry a user, so that the user can sit stably on the supporting device. Under certain circumstances, it is important that the bearing surface formed by the supporting device is kept horizontal.

And when the floor/ground supporting the supporting device shakes, for example when the floor supporting the supporting device is a deck of a ship, the floor (the deck of the ship) supporting the supporting device usually shakes during the sailing of the ship, so the body carried on the supporting device will be also affected to a certain extent. For example, when the supporting device is implemented as a stool and is used to support a user, if the supporting device is shaken strongly, it may bring the user supported by the bearing surface an uncomfortable feeling of vertigo.

For another example, when the supporting device is implemented as a table and is used to support a precise measurement instrument, if the bearing surface formed by the supporting device is inclined, it is likely to cause an evident measurement error of the precise measurement instrument.

The basic reason causing the above problems is that, in the prior art, the angle of the bearing surface of the supporting tool with respect to the ground (floor) is generally fixed, so that when the bearing surface is inclined, it is impossible to automatically adjust the position of the bearing surface and to maintain the bearing surface of the supporting device to be horizontal.

SUMMARY OF THE INVENTION

An object of the present invention is to provide a horizontal instrument, a supporting device and a method for maintaining a spatial position of a bearing surface of a supporting device, wherein the supporting device comprise a main body and a horizontal instrument, the main body has a bearing surface and a bottom surface, when the bearing surface is inclined relative to a horizontal direction, the horizontal instrument is configured to automatically adjust the bearing surface of the supporting device to be parallel to a horizontal plane.

Another object of the present invention is to provide a method for maintaining a spatial position of a bearing surface of a supporting device, wherein the bearing surface of the supporting device can be held at a predetermined height in the vertical direction by using the horizontal instrument.

Another object of the present invention is to provide a method for maintaining a spatial position of a bearing surface of a supporting device, wherein the horizontal instrument can eliminate the tilting angle of the bearing surface relative to a horizontal plane by driving a slider to slide.

The present invention provides a horizontal instrument, for maintaining a bearing surface parallel to a horizontal plane, wherein the horizontal instrument comprises:

a slide-swing assembly, and a monitoring assembly, wherein the slide-swing assembly includes a swinging rod, at least one slider, at least one driving unit, and a pivot member, the swinging rod and the pivot member are so structured that an upper end of the swinging rod is connected to a carrier seat through a pivot member, wherein the carrier seat has a top surface as a bearing surface, the swinging rod has a lower end, wherein the lower end of the swinging rod is swingably mounted on a slider's surface, the monitoring assembly includes a controller and a sensor such as an angle sensor, wherein the sensor is so configured as to be able to monitor whether the bearing surface is parallel to a horizontal plane, when the monitoring assembly detects that the bearing surface is not parallel to the horizontal plane, the controller instructs the driving unit to drive the slider to slide, which leads the lower end of the swinging rod to slide, and then drives the swinging rod to swing, thereby, the upper end of the swinging rod drives the bearing surface to rotate for an angle so that the bearing surface is maintained parallel to the horizontal plane.

Optionally, the slide-swing assembly comprises a first slider, a second slider, a first driving unit and a second driving unit, wherein said first slider is slidably mounted in a base and is driven by the first driving unit; the second slider is slidably mounted in the base, and is located between the first slider and a base bottom, and the second slider is driven by the second driving unit.

Optionally, the moving direction of the first slider and the moving direction of the second slider slide are set to be two non-collinear directions.

Optionally, the moving direction of the first slider and the moving direction of the second slider slide are perpendicular to each other.

Optionally, the monitoring assembly further includes a distance/height sensor, wherein said horizontal instrument comprises a lifting assembly, which is so configured as to take the bearing surface of the carrier seat to move up and down.

Optionally, the pivot member has an at least partially spherical surface.

Our invention also provides a supporting device, wherein the supporting device comprises:

a main body, wherein the main body comprises a base and a carrier seat, wherein the carrier seat provides a bearing surface;

a horizontal instrument as claimed in any one of claims 1 to 6 for maintaining the bearing surface parallel to a horizontal plane.

Our invention further provides a method of adjusting a bearing surface of a supporting device to be horizontal, comprising following steps:

Step one: monitoring whether the bearing surface is horizontal or not; and

Step two: when the bearing surface is not parallel to the horizontal plane, driving the lower end of the swinging rod to slide, which drives the swinging rod to swing and then drives the bearing surface on the carrier seat to rotate for an angle, thereby, the bearing surface is adjusted back to the horizontal direction.

Optionally, the method includes a step of:

leading the lower end of the oscillating rod to slide in two non-collinear directions by driving two sliders.

Optionally, the method includes steps of:

monitoring whether the space height of the bearing surface changes or not; and when the space height of the bearing surface changes, adjusting the bearing surface back to the original height by driving to the carrier seat to move up or down.

These objects and advantages as well as further objects and advantages of the present invention will be illustrated by detailed description and drawings as blow.

DETAILED EMBODIMENTS

Figure 1:
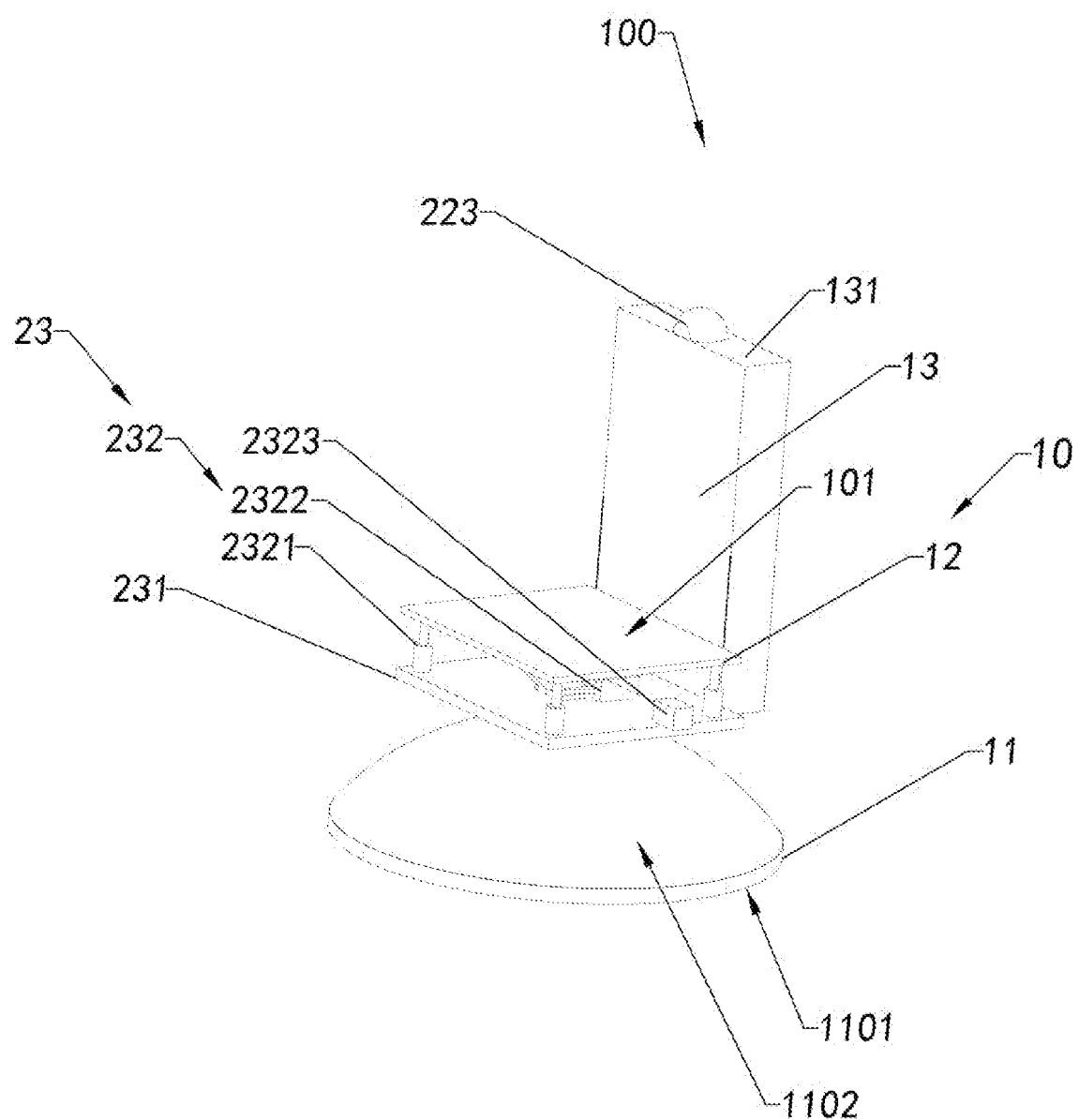
FIG. 1 shows a perspective view of a supporting device of the present invention.

The following description is presented to disclose the invention to enable those skilled in the art to implement the invention. The embodiments in the following description are only examples. Those skilled in the art can understand and realize that some other obvious variations would also apply. The basic principles of the invention as depicted in the following description may be applied to other similar embodiments, modifications, improvements, equivalents, and any embodiments that do not depart from the spirit and scope of the invention.

It should be understood by those skilled in the art that in the disclosure of the present invention, that the terms "longitudinal", "transverse", "upper", "lower", "front", "back", "left", "right", "upright", "horizontal", "top", "bottom", "inside", "outside", which indicate the orientation or position relationship shown in the drawings, are merely for convenience of describing the present invention. The above terms are not to be understood as a limitation that the invention must has such a specific orientation or position relationship.

It can be understood that the term "a" means "at least one" or "one or more". That is to say, in one embodiment, the number of an element may be one, and in some other embodiments, the number of the element may be multiple, and the term "a" cannot be understood as a limitation to the quantity.

Referring to FIGS. 1 to 8B, a supporting device 100 according to an embodiment of the present invention is described in detail as below, wherein the supporting device 100 can be used to support at least one to-be-supported body.

Figure 2:
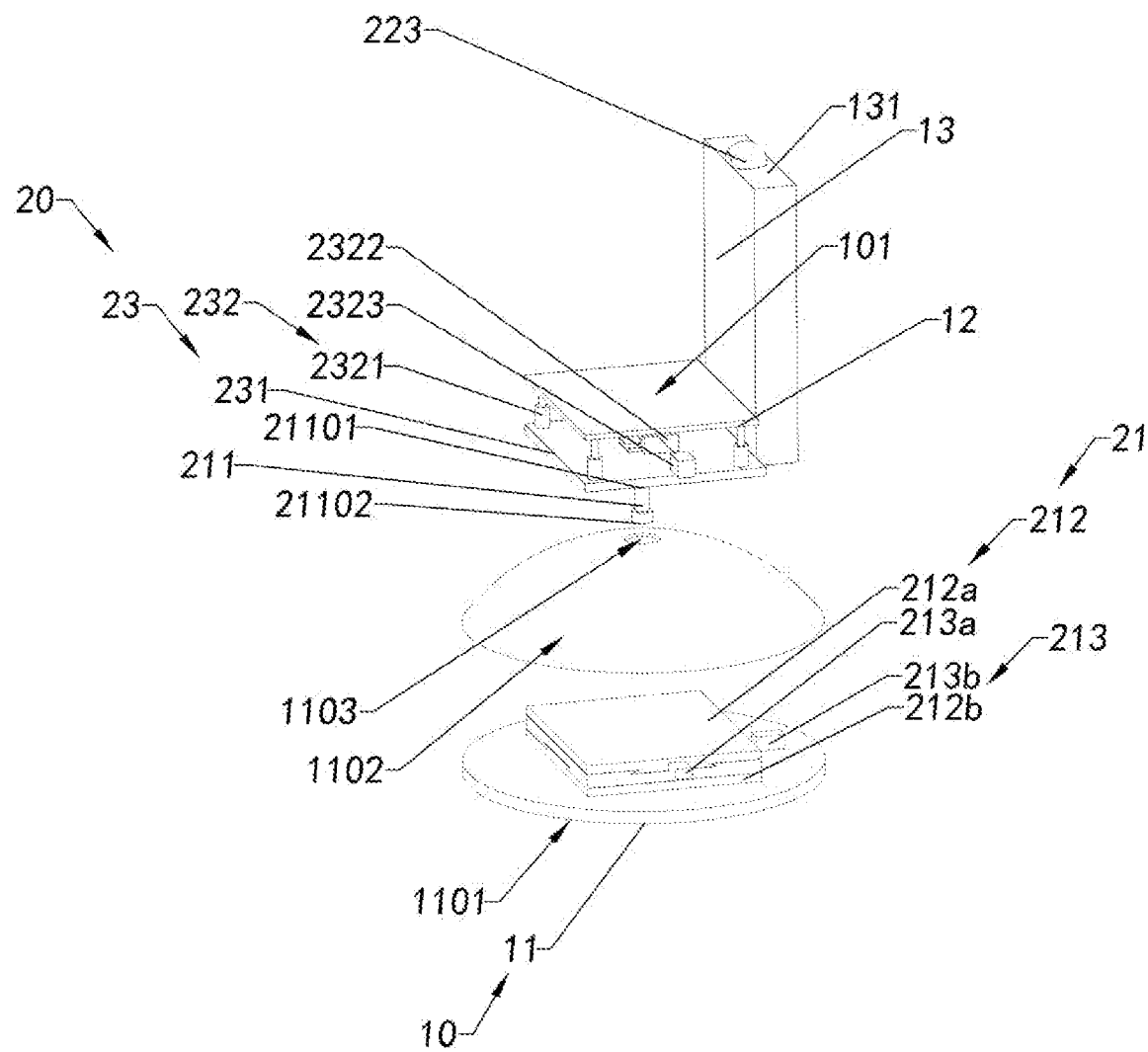
FIG. 2 shows a disassembly drawing of partial structure of the supporting device of the present invention.

Referring to FIGS. 1 and 2, the supporting device 100 of the present invention includes a main body 10 and a horizontal instrument 20. The main body 10 provides a bearing surface 101 at a predetermined height for supporting the to-be-supported body at the predetermined height. The horizontal instrument 20 is so configured as to be able to monitor the spatial position of the bearing surface 101, and to automatically adjust the spatial position of the bearing surface 101 of the main body 10 on the basis of the monitoring results, thereby ensuring that the bearing surface 101 of the main body 10 is kept parallel to the horizontal plane.

Specifically, the main body 10 of the supporting device 100 includes a base 11 and a carrier seat 12.

In one embodiment, the base 11 has a curved upper panel 1102 and a flat lower plate 1101, see FIG. 2.

The base 11 has a bottom surface 1101, for supporting the supporting device 100 on a plane, such as a ship deck, a floor, or the ground. The top surface of the carrier seat 12 forms a bearing surface 101, for carrying the to-be-supported body. Those skilled in the art can understand that the to-be-supported body may be an article or a person.

Optionally, the main body 10 further includes an accessory bracket 13, such as a backrest of a chair/sofa. In one example, the accessory bracket 13 is mounted on one side of the carrier seat 12, and forms an upper end-portion 131 with respect to the carrier seat 12.

Figure 8A:
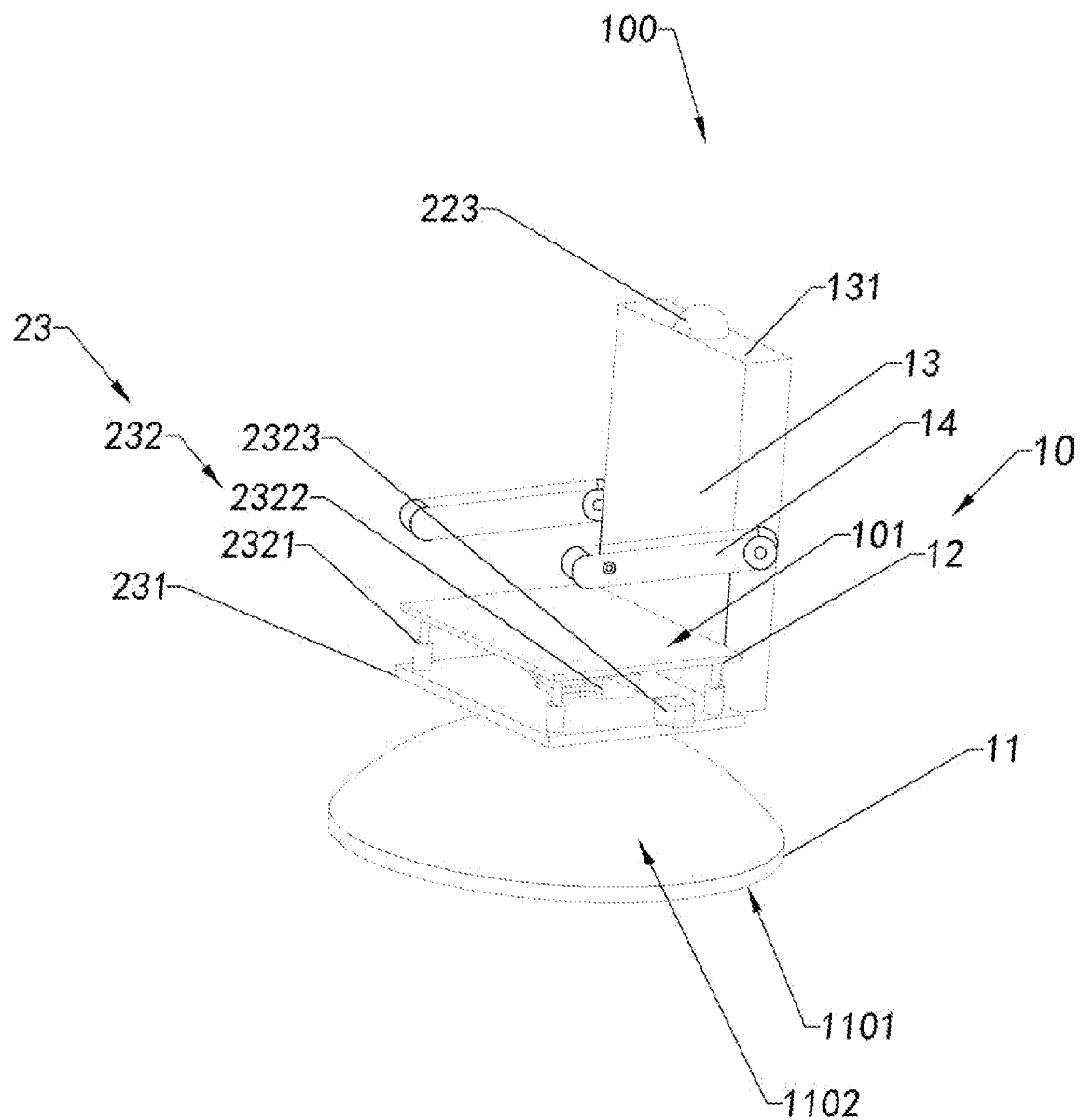
FIGS. 8A and 8B are perspective views respectively showing different states of the armrest of the supporting device according to an embodiment of the present invention.
Figure 8B:
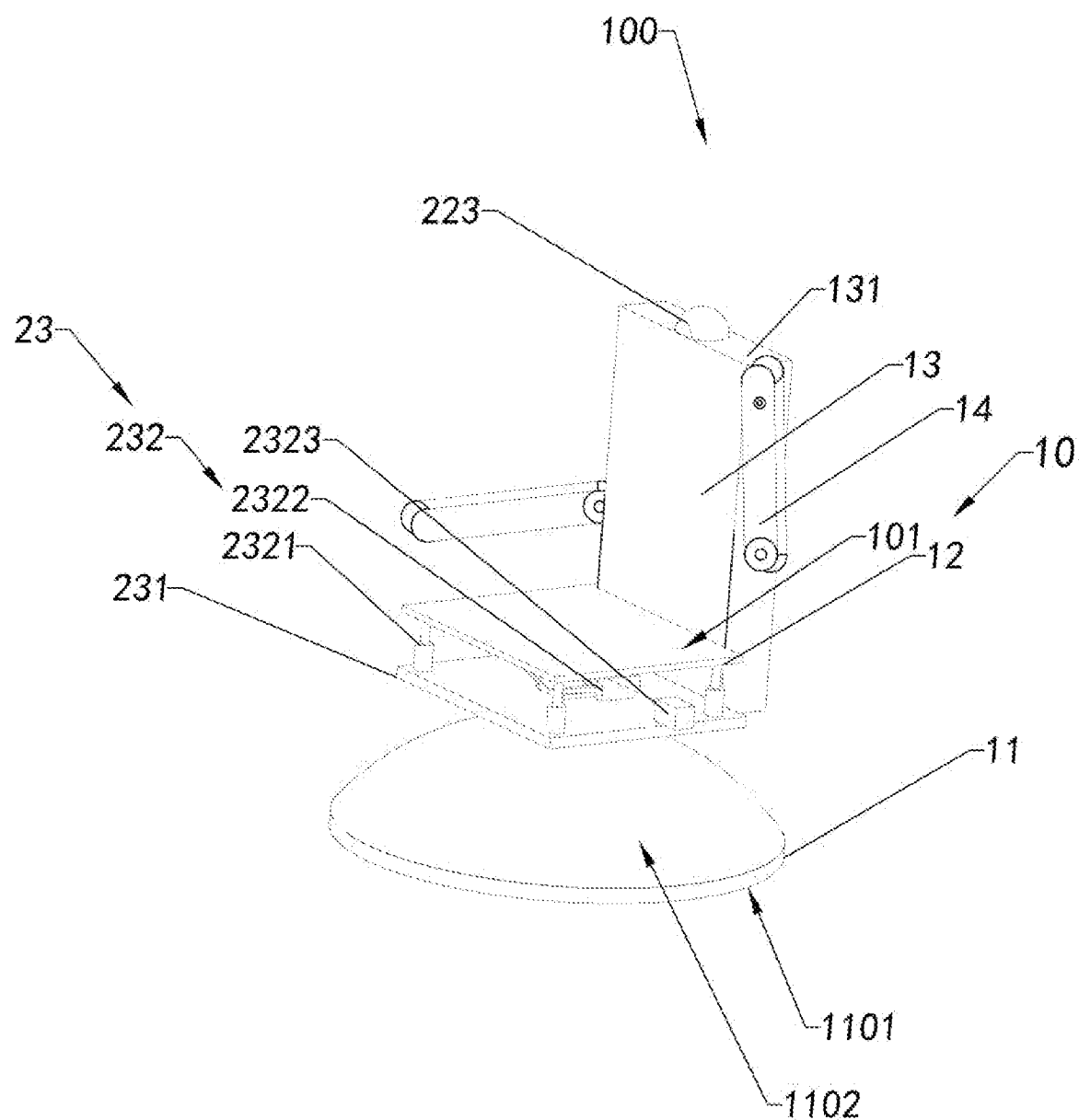

Optionally, referring to FIGS. 8A and 8B, the main body 10 further includes a pair of armrests 14, wherein the pair of the armrests 14 are respectively mounted on two sides of the bracket 13. For example, the supporting device 100 is thus implemented as a stool or a chair or a sofa. Optionally, the armrests 14 are rotatably mounted on two sides of the bracket 13 so that when the user wants to use the armrests 14, he can put the armrests 14 at different positions by rotating the armrests 14.

Figure 3:
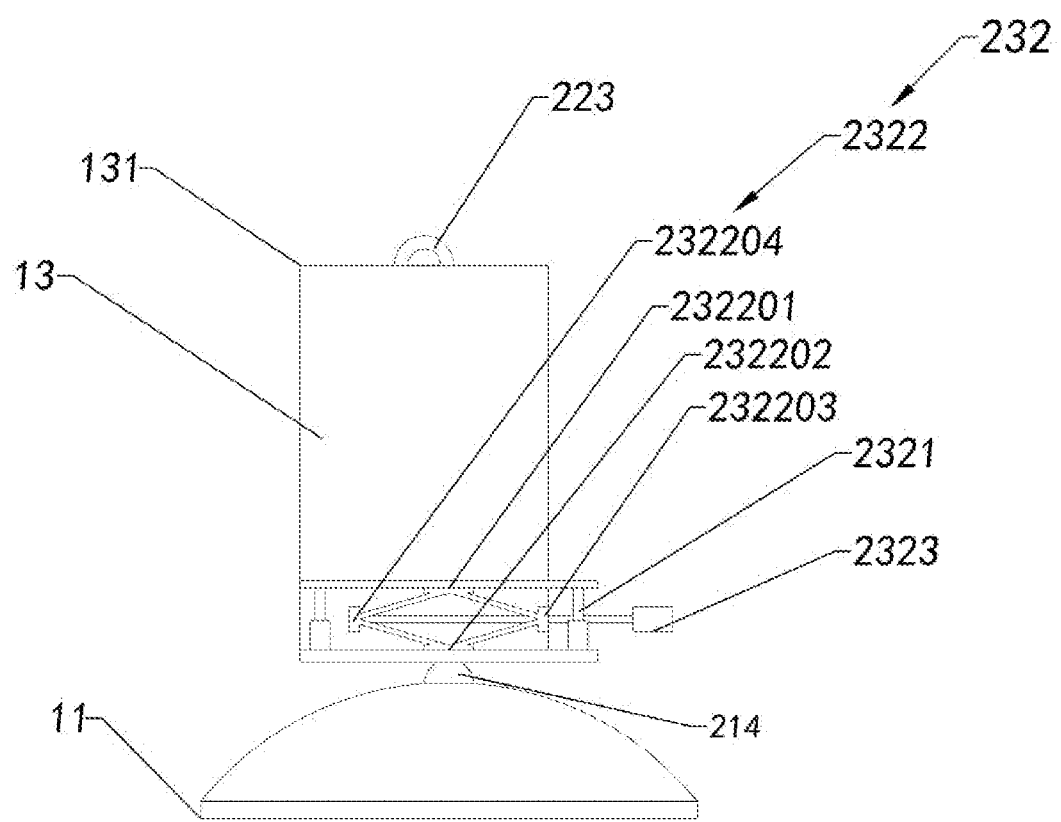
FIG. 3 shows a left view of the supporting device of the present invention.

As shown in FIGS. 2 and 3, the horizontal instrument 20 includes a slide-swing assembly 21 and a monitoring assembly 22.

The so-called slide-swing assembly comprises at least one sliding mechanism and at least one swinging mechanism, which can especially link a sliding movement to a swinging movement, for example, transform a sliding movement into a swinging movement.

The carrier seat 12 is swingably supported by the base 11 through the slide-swing assembly 21.

The monitoring assembly 22 is so configured as to be able to monitor whether the spatial position of the bearing surface 101 has changed, such as to monitor whether its spatial position relative to a certain anchor point has changed, such as to monitor whether the bearing surface 101 is parallel to a horizontal plane or not. Upon detecting that the bottom surface 1101 of the base 11 is inclined with respect to the horizontal plane, the monitoring assembly 22 controls the slide-swing assembly 21 and makes the bearing surface 101 parallel to the horizontal plane.

Referring to FIGS. 1 to 3, the slide-swing assembly 21 includes a swinging rod 211, at least one slider 212, at least one driving unit 213, and at least a pivot member 214. The swinging rod 211 has an upper end 21101 and a lower end 21102.

Figure 5A:
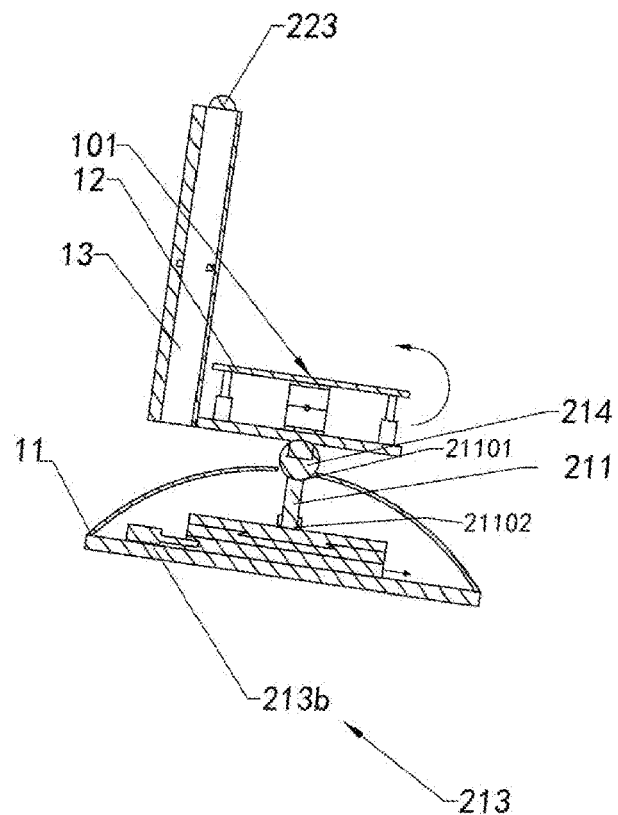
FIG. 5A shows a state of the supporting device of the present invention when its base tilts.

The pivot member is able to provide a relatively stationary fulcrum such that the swing rod 211 can swing about the fulcrum. Optionally, the pivot member 214 has an at least partially spherical surface. In one embodiment, as shown in FIG. 5A, the pivot member 214 contains a body like a ball. In one embodiment, the center of the sphere is the fulcrum of the swinging of the swinging rod 211. During the swinging of the swinging rod, the relative position of the center of the sphere relative to the base 11 is unchanged, and the relative position of the center of the sphere relative to the carrier seat 12 is also unchanged. i.e. That is a relatively stationary fulcrum.

In an embodiment, as shown in FIG. 2, the upper surface of the base 11 has a curved surface, such as a cambered surface 1102, and a mounting hole 1103 is located at the middle of the cambered surface 1102. As shown in FIG. 5, the diameter of the spherical body of the pivot member 214 is larger than the diameter of the mounting hole 1103. During installation, the spherical body of the pivot member 214 is placed into the mounting hole 1103 from the top down, thus, the spherical body of the pivot member 214 is stuck in the mounting hole 1103. Thereby, the pivot member 214 can support the upper structure in a very firm way.

The bottom of the carrier seat 12 is fixed to the upper end of the pivot member 214, and the lower end of the pivot member 214 is fixed to the upper end 21101 of the swinging rod 211, so that during the swinging, the relative position of the bottom surface of the carrier seat 12 relative to the upper end 21101 of the swinging rod is unchanged. There is a fixed angle between the bottom surface of the carrier seat 12 and the longitudinal axis of the swinging rod 211. For example, the bottom surface of the carrier seat 12 and the longitudinal axis of the swinging rod 211 always form a 90-degree angle.

The lower end 21102 of the swinging rod 211 is swingably mounted somewhere on the surface of the slider 212. When swinging, the angle between the surface of the slider 212 and the longitudinal axis of the swinging rod 211 would change.

Figure 5B:
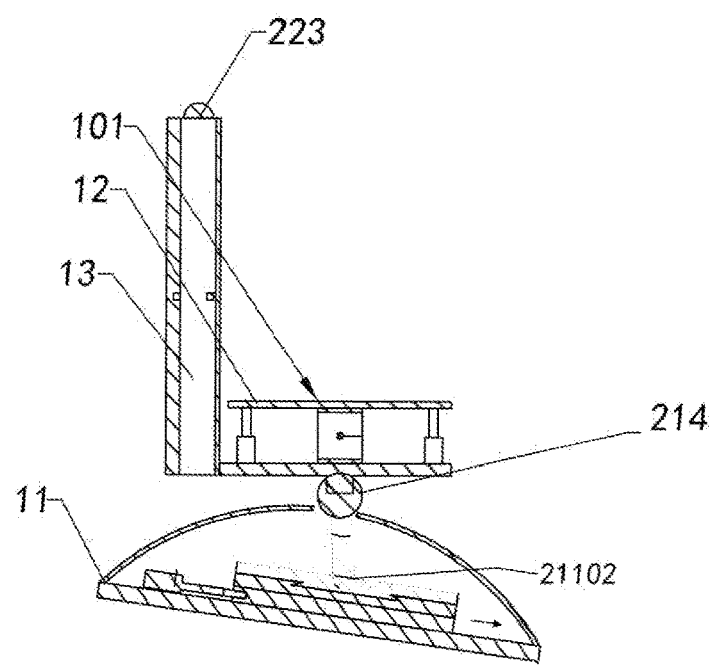
FIG. 5B shows another state of the supporting device of the present invention when its base tilts.
Figure 5C:
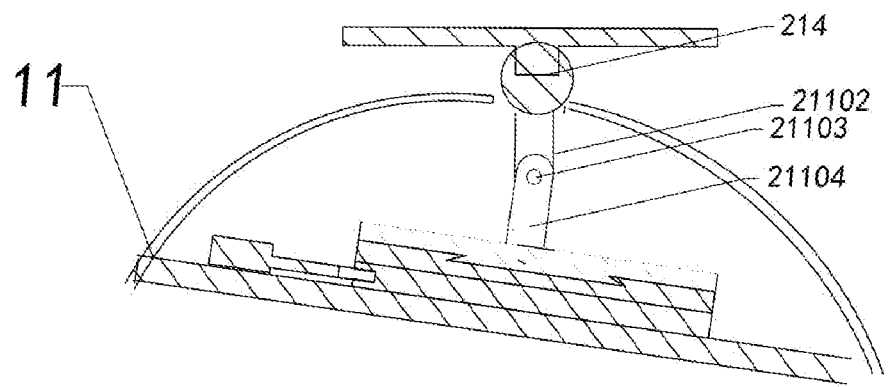
FIG. 5C is a schematic view showing a partial structure of an embodiment of the supporting device of the present invention.

As an example shown in FIG. 5C, the lower end 21102 of the swinging rod is mounted to a fastening element 21104 by a hinge 21103, and the fastening element 21104 is mounted somewhere on the surface of the slider 212. The lower end 21102 of the swinging rod is thus rotatable around the axis of the hinge 21103.

In another embodiment, the lower end 21102 of the swinging rod is mounted somewhere on the surface of the slider 212 by a structure of two hinges. In this structure, two hinges are provided in different directions (e.g., in two orthogonal directions), so that the lower end 21102 of the swinging rod can easily move in a two-dimensional plane without destroying the overall jointing structure.

Regarding that the lower end 21102 of the swinging rod 211 is swingably mounted on the surface of the slider 212, the present invention is not limited to the structure of the embodiment of FIG. 5C, some other structures, such as universal joints, fisheye-shape connectors, joint bearings, and the like can also achieve similar functions.

Figure 5D:
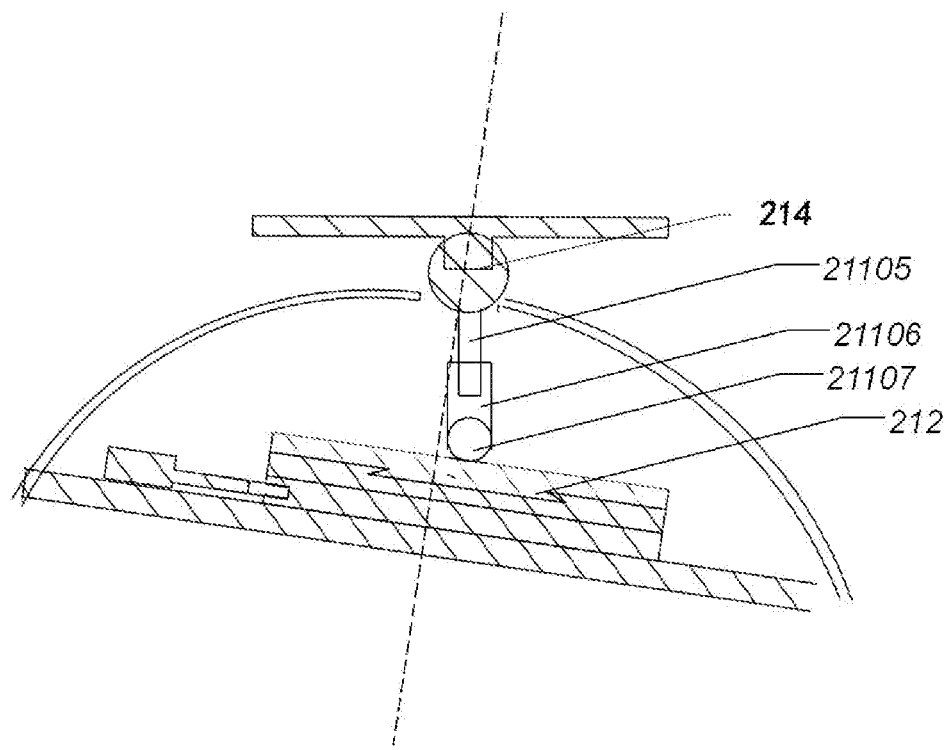
FIG. 5D is a schematic view showing a partial structure of another embodiment of the supporting device of the present invention.

Additionally and optionally, the swing bar 211 has an adjustable length, for example has a telescopic sleeve/rod as shown in FIG. 5D. For example, the swinging rod 211 has an inner rod 21105 and an outer tube 21106, and one end of the inner rod 21105 is located inside the outer tube 21106, and the outer tube 21106 connects to the slider 212 through a universal joint 21107. When the universal joint 21107 (lower end 21102 of the swinging rod) moves with the slider 212, its distance from the mounting hole 1103 may change, especially when the tilting angle to be adjusted is relatively large, the distance difference will be obvious. When the length of the swinging rod 211 is changeable, the lower end 21102 of the swinging rod is able to move along with the slider 212 in a larger distance, thereby enabling to adjust a larger range of tilting angle.

When the slider 212 is driven by the driving unit 213 and slides relative to the base 11, it brings the lower end 21102 of the swinging rod 211 to slide synchronously with it (together with it), thereby driving the swinging rod 211 to swing around the pivot member 214. When the swinging rod 211 swings, it drives the carrier seat 12 to rotate, thereby adjusting the tilting direction of the carrier seat 12. The pivot member provides a fulcrum like the fulcrum of a teeter-board, one end of which connects to the lower end 21102 of the swinging rod, and the other end connects to the carrier seat 12. When one end rotates, it will drive the other end to rotate.

Optionally, the slide-swing assembly 21 in the present invention may include a first slider 212a, a second slider 212b, a first driving unit 213a and a second driving unit 213b. The first slider 212a is slidably mounted in the base 11 by the first driving unit 213a. The second slider 212b is located between the first slider 212a and the bottom of base 11, and is slidably mounted in the base 11, and is driven by the second driving unit 213b. That is, when the first driving unit 213a drives the first slider 212a to slide, the first slider 212a slides relative to the second slider 212b. When the second driving unit 213b drives the second slider 212b to slide, the second slider 212b and the first slider 212a slide together, i.e. the second slider 212b drives the first slider 212a to slide together with the second slider 212b.

Optionally, when the first slider 212a and the second slider 212b are driven to slide, the first slider 212a and the second slider 212b slide in two non-collinear directions respectively. For example, in the present invention, the moving direction of the first slider and the moving direction of the second slider slide may be implemented as two orthogonal directions, i.e. the two directions are orthogonal/perpendicular to each other. Thereby, the position of the lower end 21102 of the swinging rod can be quickly moved in a two-dimensional plane by sliding the sliders 212a and 212b. In this way, the tilting angle of the bearing surface 101 of the carrier seat 12 with respect to the horizontal direction can be quickly adjusted.

It can be understood by those skilled in the art that in the present invention, the first driving unit 213a or/and the second driving unit 213b may be implemented as a servo motor, a hydraulic driving device, etc., and the present invention should not be limited in this respect.

Furthermore, in the present invention, the movement of the slide-swing assembly 21 is controlled by the monitoring assembly 22. Specifically, the drive unit 213 of the slide-swing assembly 21 is controlled by the monitoring assembly 22. The monitoring assembly 22 is so configured as to be able to detect a tilting angle of the bearing surface 101 of the carrier seat 12 with respect to a horizontal direction. And when the bearing surface 101 of the carrier seat 12 is inclined with respect to a horizontal plane, the monitoring assembly 22 automatically calculates and drives the slide-swing assembly 21 to perform a swing to a degree, thereby adjusting the tilting angle of the bearing surface 101 of the carrier seat 12 and maintaining the bearing surface 101 parallel to the horizontal plane.

Referring to FIGS. 1 to 4, as an example, the monitoring assembly 22 may include a controller 221 and an angle sensor 222. The controller 221 and the angle sensor 222 may be electrically connected or wirelessly communicated.

The angle sensor 222 is so configured as to be able to detect an angle at which the carrier seat 12 is inclined with respect to a horizontal plane. The angle sensor 222 can be implemented as an electromagnetic sensor, a light sensor, and so on.

The controller 221 is able to control the driving unit 213 to drive the slider 212 to slide.

In one embodiment, the angle sensor 222 or/and the controller 221 is located in the main body 10, for example, under the bearing surface 101 of the carrier seat 12.

In an example, the angle sensor 222 may be disposed in a sensor box 223, and the sensor case may be located on the holder 13 or in the holder 13. As an alternative, the sensor box can also be placed in the carrier seat 12, such as below the bearing surface 101.

Figure 4A:
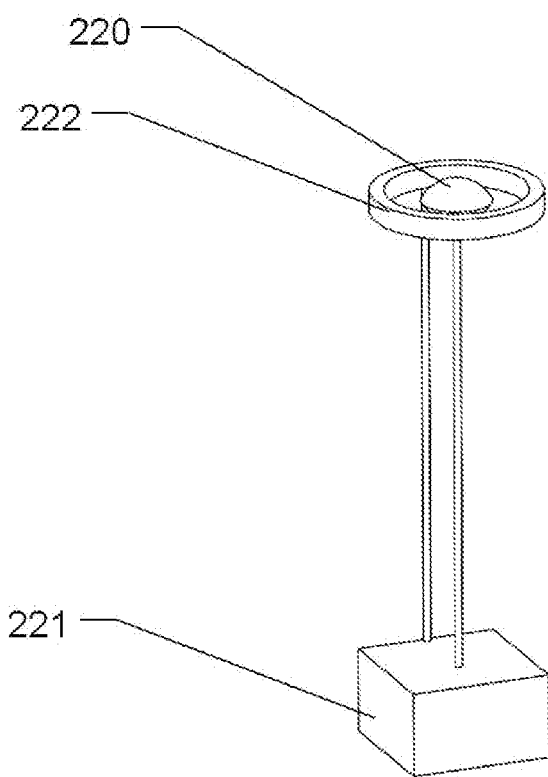
FIG. 4A shows a schematic structure of the monitoring assembly of the supporting device of the present invention.

Optionally, our invention comprises an anchor point (or anchor plane) 220, which can maintain its own spatial position (horizontal direction and/or spatial height, etc.) unchanged. Besides, the angle sensor 222 take the anchor point as a reference point to determine whether the bearing the face is inclined with respect to the horizontal plane. As shown in FIG. 4A, a sensor ring is provided surrounding the anchor point 220 and in the vicinity of the anchor point 220. There may be one or more sensors located on the sensor ring, for example, the angle sensor 222 may be located on the sensor ring.

In an embodiment, the anchor point is provided by an automatic space-stabilizing system, i.e. a self-stabilizing apparatus, such as a self-stabilizing head or a self-stabilizing gimbal. In prior arts, self-stabilizing apparatus has been successfully applied in stabilization of cameras or video cameras, for example camera gimbal for handheld shooting. Some self-stabilizing apparatuses use IMUs (Inertial Measurement Unit) to obtain the data of acceleration and/or rotation such as angular velocity and/or accelerated velocity, and then drive its motors to adjust in a reverse direction, so that the items on the self-stabilizing gimbal can be kept stable.

Figure 4B:
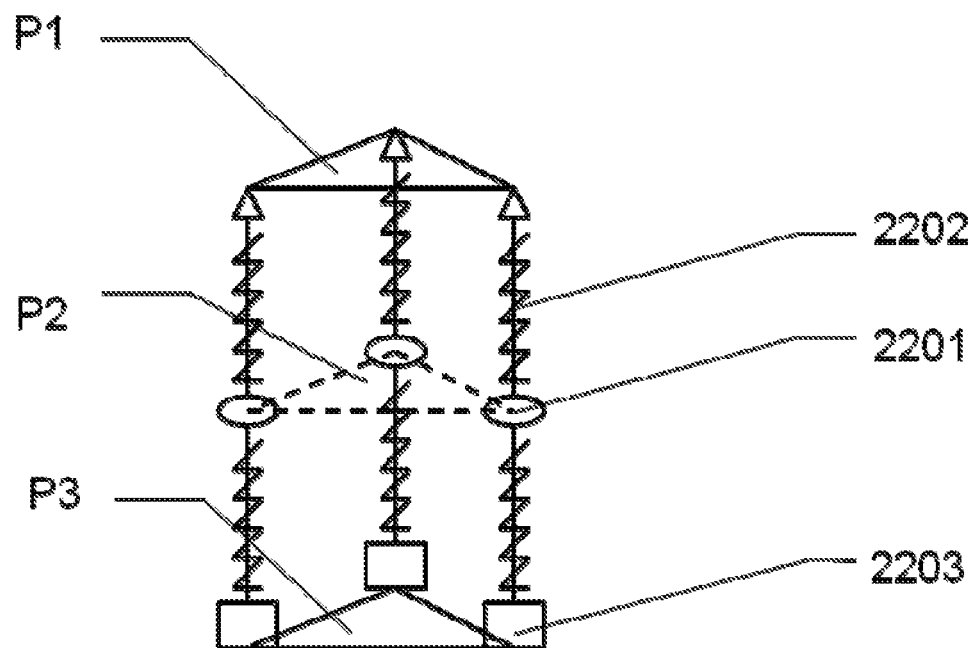
FIG. 4B shows a schematic structure of a self-stabilizing gimbal in the present invention.

FIG. 4B shows a self-stabilizing apparatus 220 of the present invention having three sets of IMU sensors 2201, three sets of motors 2203, and three sets of adjustment screws 2202. The upper end and/or the lower end of the self-stabilizing apparatus 220 is mounted to a plane P1 and/or P3, which may be a plane in the bracket 13 or the carrier seat 12, and P and/or P3 will incline along with the inclination of the carrier seat 12 (the bearing surface 101). When P and/or P3 is (are) inclined with respect to the horizontal plane, each of the three sets of IMU sensors 2201 hanging in the apparatus detects accelerated velocity in the vertical direction (z direction), and on the basis of the measured accelerated velocity, each of the three motors 2203 adjusts the length of the screw 2202, so that the position of the IMU sensors 2201 are returned back to their original location (for example in z direction).

In one embodiment, the three sets of motors are independent, they calculate the adjustment to the respective screw (for example the direction and magnitude of the adjustment) on basis of the respective sensor data. However, the calculation method of the controllers of the three sets of motors may be the same. That is, the calculation method and software program in the controllers of the three sets of motors may be the same. When P1 is inclined with respect to the horizontal plane, the accelerated velocity measured by the three sets of IMU sensors 2201 may be different, and the three sets of motors 2203 respectively adjust the respective screws according to the respective sensor measurement results, so that the respective sets of IMU sensors 2201 return to original position. Thereby, a self-stabilizing plane P2 is achieved.

In such an embodiment, since only one direction (z direction) is involved in the accelerated-velocity data and in the screw adjustment, the calculation procedure can be relatively simple and the adjustment response can be relatively fast.

In another embodiment, the monitoring assembly 22 includes an aerocraft, such as an unmanned aerial vehicle. The aerocraft has a function of hovering, so that it can also provide an anchor point that can maintain its own position (horizontal direction and/or height, etc.) unchanged.

In another embodiment, the present invention does not use an anchor point 220, but mounts some IMU sensors in the bracket 13 or in the carrier 12, and gathers measurement data (such as accelerated velocity) from these IMU sensors. By combining and calculating all the sensors' data, the tilting angle to be adjusted by the present invention is calculated, and then the controller 221 calculates the direction and displacement in which it drives the slider 212 to slide. The sensor structure in this embodiment is simpler, but the calculation procedure is much more complicated, and the titling angle of the whole plane calculated by this embodiment is not as accurate as that of the embodiment with anchor point.

Figure 6:
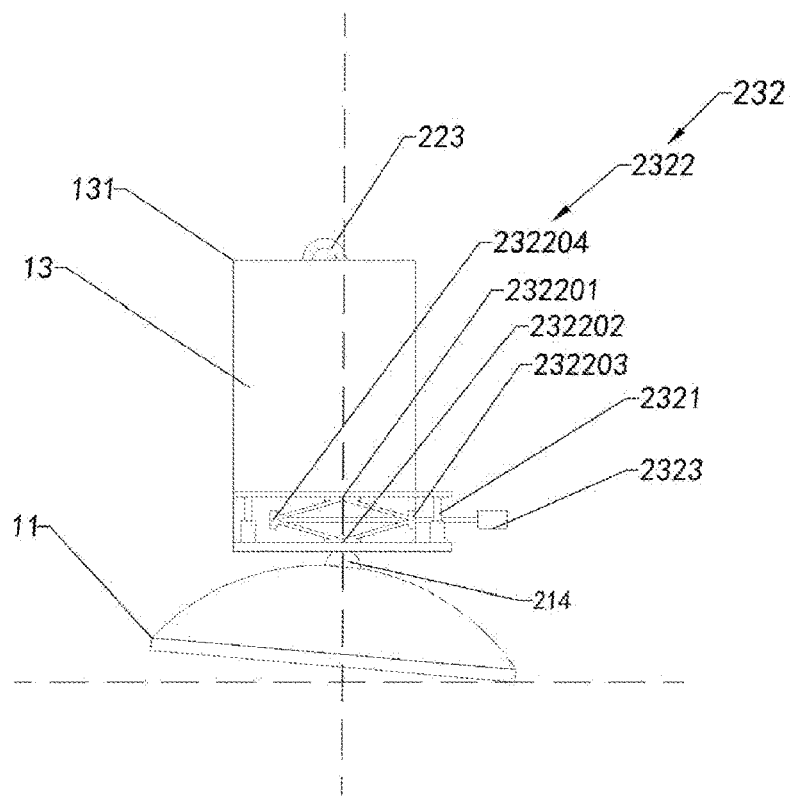
FIG. 6 is a view showing a state when the supporting device of the present invention shakes up and down.

The working process of the monitoring assembly 22 of the present invention is for example shown in FIG. 5 and FIG. 6. When the floor/ground supporting the supporting device is inclined, for example when the ship deck is shaken and tilted, the base 11 is inclined, which also causes the tilting of the carrier seat 12 and then the tilting of the bearing surface 101, as shown in the FIG. 5A. At this time, the angle sensor 222 detects that the bearing surface 101 of the carrier seat 12 is inclined with respect to the horizontal plane, and reports the result of the tilting to the controller 221. After that, the controller 221 automatically calculates and controls the driving unit 213 to drive the slider 212 to slide. In FIG. 5A, the slider 212 is driven to slide in the direction of the arrow (the right direction on the paper) for a distance, which makes the lower end 21102 of the swinging rod 211 also slide in the direction for the distance, thus achieving the state of FIG. 5B. In FIG. 5B, the lower end 21102 of the swinging rod 211 has moved a distance along the slider 212, so that the swinging rod 211 is no longer perpendicular to the slider's surface at 90 degrees, but rather at an inclined angle. It means that the swinging rod 211 has a swing around the pivot member 214. The pivot member 214 provides a fulcrum like the fulcrum of a teeterboard, one end of which connects to the lower end 21102 of the swinging rod 211 and the other end connects to the carrier seat 12. When one end rotates, it will drive the other end to rotate.

When the swinging rod 211 swings for an angle, the upper end of the pivot member 214 drives the carrier seat 12 to also rotate for the same angle, thereby compensating for inclination of the bottom surface 1101, and adjusting the bearing surface 101 back to the horizontal direction, i.e. the bearing surface 101 is kept parallel to the horizontal plane, as shown in FIGS. 5B and 6.

In an embodiment, the controller 221 is configured to control the first driving unit 213a and the second driving unit 213b, to drive the first slider 212a and the second slider 212b to slide in two non-collinear directions respectively, for example called as x and y directions. The lower end 21102 of the swinging rod 211 is thus able to slide along with the first slider 212a and the second slider 212b in the two directions, for example x and y directions. Thus, The inclination of the bearing surface 101 in both two directions (x and y directions) with respect to the horizontal plane can be adjusted. It means that any kind of inclination of the bearing surface 101 with respect to the horizontal plane can be adjusted. When the slider 212 slides, it drives the swinging rod 211 to swing, and thereby adjusting the bearing surface 101 back to the horizontal direction.

Optionally, referring to FIG. 1 to FIG. 3, the horizontal instrument 20 further includes a lifting assembly 23, which can lift the bearing surface 101 of the carrier seat 12 up and down relative to the base 11.

In one example, the lifting assembly 23 includes a bottom plate 231 and a telescopic member 232, and the carrier seat 12 is mounted on the bottom plate 231 through the telescopic member 232. Referring to FIG. 3, the telescopic member 232 optionally includes at least three telescopic cylinders 2321, a height adjuster 2322, and at least one lifting driver 2323. The three telescopic cylinders 2321 are mounted between a bottom surface of the carrier seat 12 and a top surface of the bottom plate 231. The height adjuster 2322 is also mounted between the bottom surface of the carrier seat 12 and the top surface of the bottom plate 231.

Optionally, the height adjuster 2322 has a top end 232201 and a bottom end 232202. The bottom plate 231 is mounted to the bottom end 232202 of the height adjuster, and the carrier seat 12 is mounted to the top end 232201 of the height adjuster. The height adjuster 2322 also has two horizontal ends 232203 and 232204, and the lifting driver 2323 drives to change the distance between the two horizontal ends 232203 and 232204 of the height adjuster 2322 (i.e. compression and elongation in horizontal direction), thereby leading to a change of the distance between the top end 232201 and the bottom end 232202 of the height adjuster 2322 (i.e. height adjustment).

Figure 9:
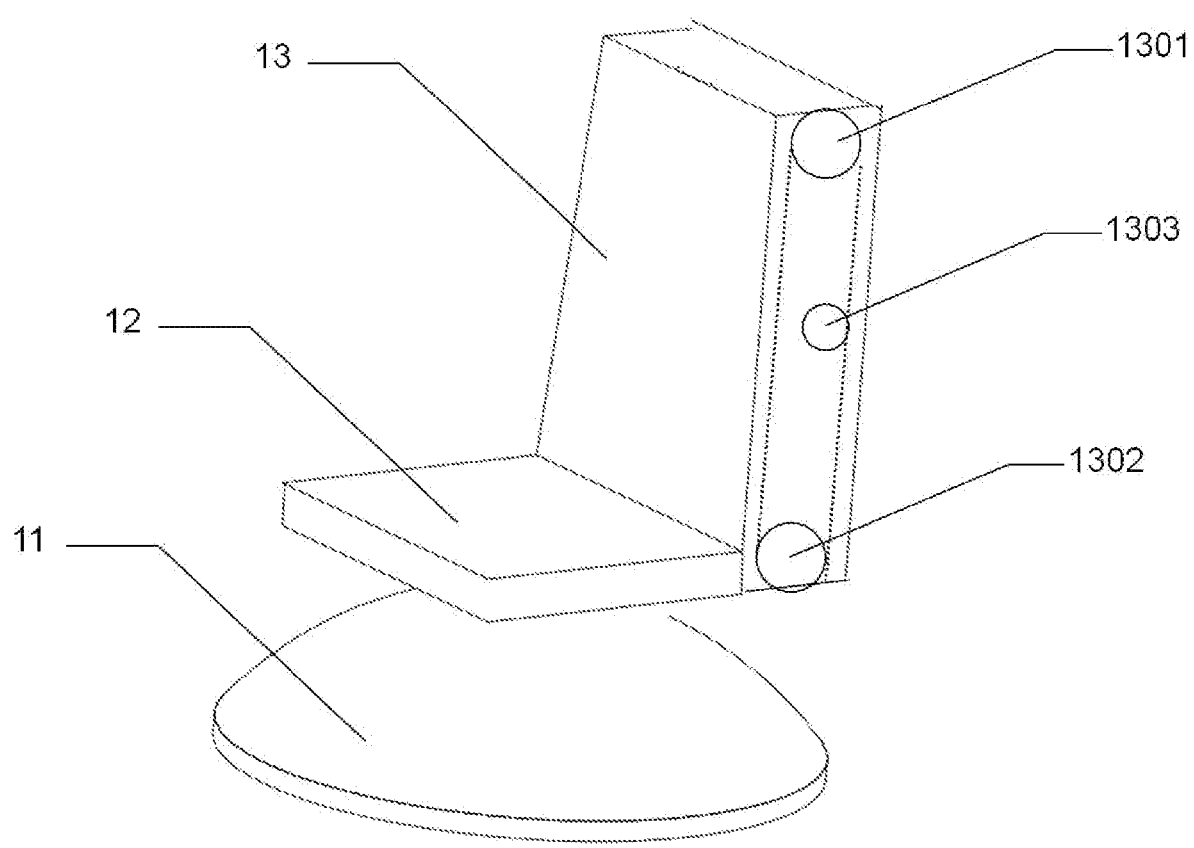
FIG. 9 is a schematic view showing an embodiment using a chain-type lifter.
Figure 10:
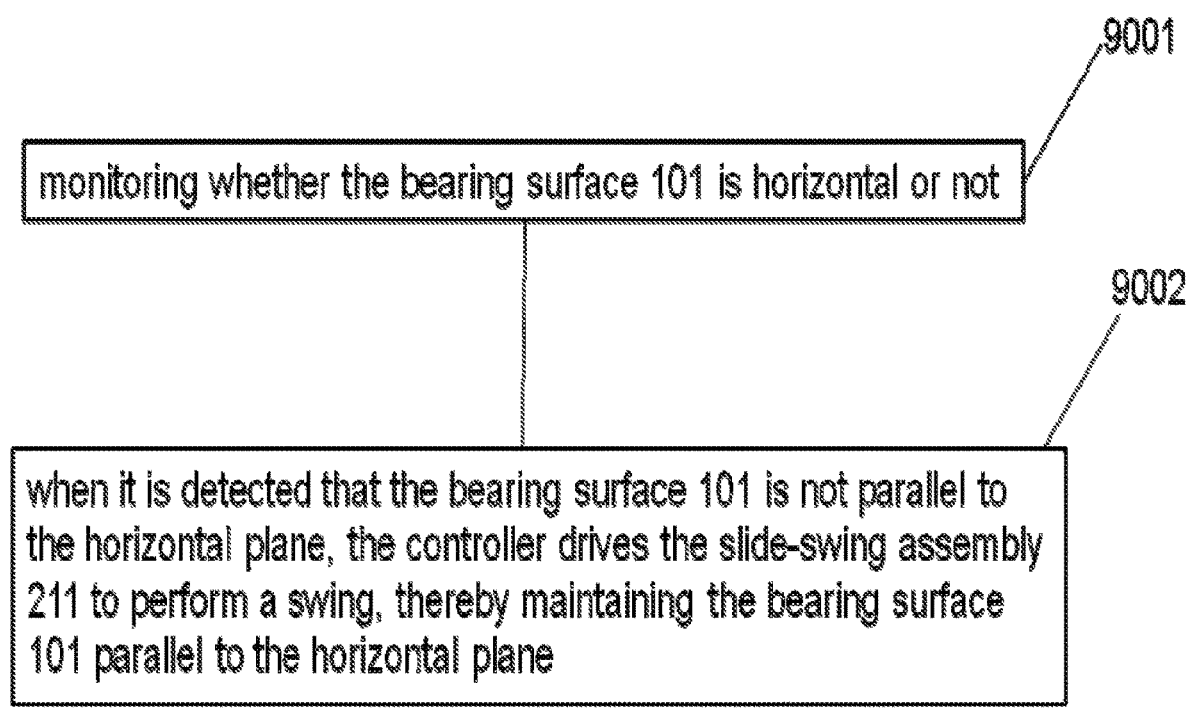
FIG. 10 is a flow chart showing a method of maintaining the spatial position of the bearing surface of a supporting device in the present invention.

In another embodiment, the lifting assembly 23 is a chain-type lifter. For example, as shown in FIG. 9, the chain-type lifter is provided on/in the bracket 13 and comprise a first gear 1301, which is a fixed pulley, such as a chain hoist, fixed on the upper end of the bracket; a second gear 1302, which is a movable pulley connected to the bearing seat 12, so as to take the bearing seat 12 to move up and down; a third gear 1303, whose clockwise/counterclockwise rotation drives the chain to move. In one embodiment, when the gear 1303 rotates clockwise, a part of chain will be stowed around a shaft, pulling the movable pulley 1302 and the carrier seat 12 upward. A lifting driver 2323 controls and drives the rotation of the third gear 1303, so as to adjust the lifting of the carrier seat 12.

In one embodiment, the monitoring assembly 22 further includes a distance sensor or a height sensor.

The controller 221 and the distance/height sensor may be electrically connected or wirelessly communicated.

Figure 7:
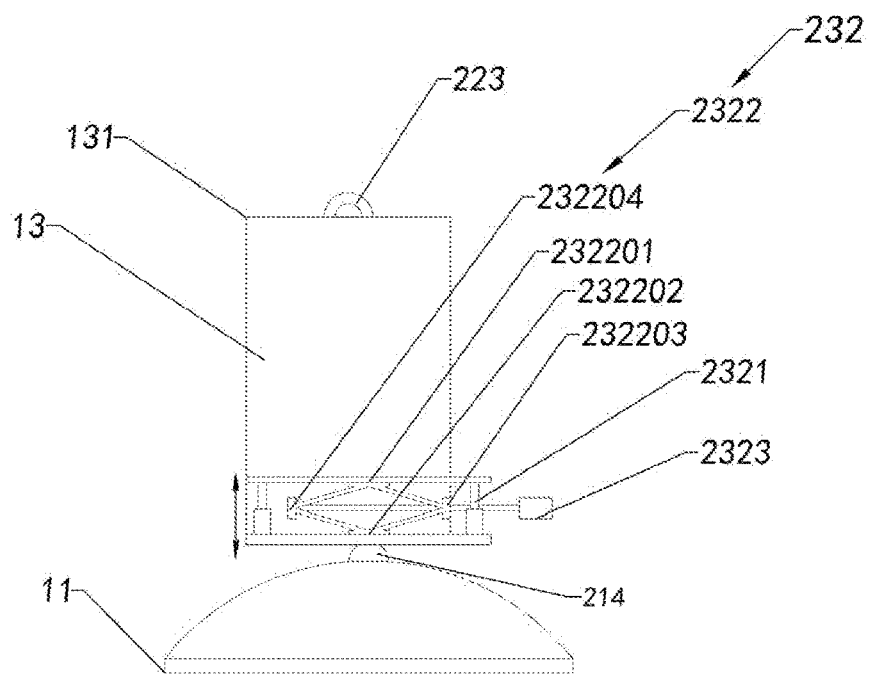
FIG. 7 is a view showing a state in which the supporting device of the present invention shakes up and down, and the support member is maintained at a spatial height.

For example, when the carrier seat 12 is shaken up or down, the distance/height sensor is able to detect that the bearing surface 101 of the carrier seat 12 has deviated from its original height. As a response, the controller 221 will automatically control and drive the lifting driver 2323 on the basis of the measurement results of the distance/height sensor, so as to bring the bearing surface 101 back to the original height, as shown in FIG. 7. The spatial height in the present invention means the absolute altitude of an object.

It can be understood by those skilled in the art that the distance/height sensor may be an acoustic wave sensor, a light sensor, an electromagnetic sensor and so on.

Optionally, as shown in FIG. 4A, an anchor point 220 capable of maintaining its own height is provided, and the distance/height sensor uses the anchor point 220 as a reference point to determine whether the bearing surface 101 has changed its height. As shown in FIG. 4A, a sensor ring is provided surrounding the anchor point 220 and in the vicinity of the anchor point 220. There may be one or more sensors located on the sensor ring, for example, the distance/height sensor may be located on the sensor ring. In one embodiment, the distance/height sensor is an electromagnetic sensor, which detects the relative displacement (change of height) between the sensor and the anchor point 220 by cutting the magnetic lines.

In an embodiment, the anchor point is provided by an automatic space-stabilizing system, i.e. a self-stabilizing apparatus, such as a self-stabilizing head or a self-stabilizing gimbal. In prior arts, self-stabilizing apparatus has been successfully applied in stabilization of cameras or video cameras, for example camera gimbal for handheld shooting. Some self-stabilizing apparatuses use IMUs (Inertial Measurement Units) to obtain the data of acceleration and/or rotation such as angular velocity and/or accelerated velocity, and then drive its motors to adjust in a reverse direction, so that the items on the self-stabilizing gimbal can be kept stable.

In another embodiment, the monitoring assembly 22 includes an aerocraft, such as an unmanned aerial vehicle. The aerocraft has a function of hovering, so that it can also provide an anchor point that can maintain its own position (horizontal direction and/or height, etc.) unchanged.

In another embodiment, the present invention does not use an anchor point 220, but mounts some IMU sensors in the bracket 13 or in the carrier 12, and gathers measurement data (such as accelerated velocity) from these IMU sensors. By combining and calculating all the sensors' data, the tilting angle and the height to be adjusted by the present invention is calculated. The sensor structure in this embodiment is simpler, but the calculation procedure is much more complicated, and the adjustment data of the whole plane calculated by this embodiment is not as accurate as that of the embodiment with anchor point.

In another embodiment, the monitoring assembly 22 of the present invention includes an aerocraft, wherein the angle sensor 222 and the distance/height sensor are both equipped on the aerocraft. By detecting the relative position of the aerocraft relative to the bearing surface 101, the distance/height of the bearing surface 101 relative to the original height as well as its tilting angle relative to the horizontal plane can be obtained.

By the above description, those skilled in the art can understand that in the present invention, the height of the bearing surface 101 of the main body 10 as well as its angle with respect to the horizontal direction is able to be automatically adjusted, when the floor/ground supporting the supporting device 100 severely shakes. Thereby, the spatial height of the bearing surface 101 of the main body 10 is kept unchanged and the bearing surface 101 is kept horizontal.

Referring to FIG. 9, in accordance with another aspect of the present invention, a method of adjusting a bearing surface of a supporting device to be horizontal is described in greater detail as below. Specifically, the method of adjusting a bearing surface of a supporting device to be horizontal includes following steps:

9001, monitoring whether the bearing surface 101 is horizontal or not; and 9002, when it is detected that the bearing surface 101 is not parallel to the horizontal plane, the controller drives the slide-swing assembly 211 to perform a swing, thereby adjusting the tilting angle of the bearing surface 101 of the carrier seat 12, thereby maintaining the bearing surface 101 parallel to the horizontal plane.

Optionally, when the bearing surface 101 is not parallel to the horizontal plane, a lower end 21102 of the swinging rod 211 of the slide-swing assembly 21 slides relative to the base 11 and drives the swinging rod 211 to swing. Thereby, the carrier seat 12 is driven to rotate, which adjusts the bearing surface 101 back to the horizontal direction.

Optionally, the method of adjusting a bearing surface of a supporting device to be horizontal comprises the step of driving the lower end 21101 of the swinging rod 211 in the slide-swing assembly 21 to slide in two non-collinear directions.

Optionally, the method of adjusting a bearing surface of a supporting device to be horizontal further comprises the following steps:

Monitoring whether the spatial height of the bearing surface 101 changes or not, in another word, monitoring whether the absolute altitude of the bearing surface 101 changes or not;

When the spatial height of the bearing surface 101 changes, adjusting the bearing surface back to its original height by lifting the carrier seat 12 up and down.

Optionally, the controller at first adjusts the titling angle of the bearing surface 101 and then adjusts the height of the bearing surface 101.

Those skilled in the art should understand that the embodiments of the present invention described in the above description and the accompanying drawings are only illustrations and not limitations. The object of the invention has been realized completely and efficiently. The functional and structural principles of the present invention have been shown and described in our embodiments of the present invention, and the implementation of the present invention may be modified or changed without departing from these principles.

We claim:

1. A horizontal instrument, for maintaining a bearing surface parallel to a horizontal plane, wherein the horizontal instrument comprises: a slide-swing assembly, and a monitoring assembly, wherein the slide-swing assembly includes a swinging rod, at least one slider, at least one driving unit, and a pivot member, the swinging rod and the pivot member are so structured that an upper end of the swinging rod is connected to a carrier seat through the pivot member, wherein the carrier seat has a top surface as the bearing surface, the swinging rod has a lower end, wherein the lower end of the swinging rod is swingably mounted on a surface of the at least one slider, the monitoring assembly includes a controller and an angle sensor, wherein the angle sensor is so configured as to be able to monitor whether the bearing surface is parallel to the horizontal plane, wherein said monitoring assembly further includes a height sensor, wherein said horizontal instrument further comprises a lifting assembly, which is so configured as to take the bearing surface to move up and down, the controller is so configured that when the monitoring assembly detects that the bearing surface is not parallel to the horizontal plane, the controller instructs the driving unit to drive the slider to slide, which leads the lower end of the swinging rod to slide, and then drives the swinging rod to swing, thereby, the upper end of the swinging rod drives the bearing surface to rotate to an angle so that the bearing surface is maintained parallel to the horizontal plane; and when the monitoring assembly detects that a spatial height of the bearing surface changes, the controller controls to drive the lifting assembly to bring the bearing surface back to its spatial height, wherein the monitoring assembly provides an anchor plane, the angle sensor is configured to take the anchor plane as a reference to determine whether the bearing surface is inclined with respect to the horizontal plane, and the height sensor is configured to take the anchor plane as a reference to determine whether the spatial height of the bearing surface is changed, wherein the anchor plane is provided by an automatic self-stabilizing apparatus that include three sets of inertial measurement units, three sets of motors, and three sets of adjustment screws, wherein each of the three sets of inertial measurement units includes one or more inertial measurement unit sensors;

wherein an upper end or a lower end of the self-stabilizing apparatus is mounted to a plane, wherein each of the three sets of inertial measurement units is configured to measure acceleration in a vertical direction, and on the basis of the measured acceleration, each of the three sets of motors is configured to adjust a length of one of the three sets of adjustment screws so that the positions of the three sets of inertial measurement units return back to original positions in the vertical direction, wherein the original positions of the three sets of inertial measurement units form the anchor plane, and wherein a horizontal direction and a spatial height of the anchor plane are maintained to be unchanged.

2. The horizontal instrument according to claim 1, wherein said slide-swing assembly comprises a first slider, a second slider, a first driving unit and a second driving unit, wherein said first slider is slidably mounted in a base and is driven by the first driving unit; the second slider is slidably mounted in the base, and is located between the first slider and a base bottom, and the second slider is driven by the second driving unit.

3. The horizontal instrument according to claim 2, wherein a moving direction of the first slider and a moving direction of the second slider slide are set to be two non-collinear directions.

4. The horizontal instrument according to claim 3, wherein the moving direction of the first slider and the moving direction of the second slider slide are perpendicular to each other.

5. The horizontal instrument according to claim 1, wherein said pivot member has an at least partially spherical surface.

\* \* \* \* \*